May 19, 1942.　　　F. MacCALLUM　　　2,283,379
DRY BATTERY
Filed Oct. 20, 1936　　　2 Sheets-Sheet 1

Frank MacCallum
Inventor

Toulmin & Toulmin
Attys.

May 19, 1942.  F. MacCALLUM  2,283,379

DRY BATTERY

Filed Oct. 20, 1936  2 Sheets-Sheet 2

Frank MacCallum
Inventor

Taulmin & Taulmin
attys.

Patented May 19, 1942

2,283,379

UNITED STATES PATENT OFFICE 2,283,379

DRY BATTERY

Frank MacCallum, Birmingham, England, assignor to Maxolite Holdings Limited, London, England Application October 20, 1936, Serial No. 106,645
In Great Britain September 9, 1935

5 Claims. (Cl. 136—131)

This invention relates to dry batteries and particularly concerns arrangements for distributing the electrolyte in the cell or cells.

It has been proposed to provide a supply of electrolyte for the cell or battery by placing between the zinc electrode and the depolariser, a sheet of paper saturated with electrolyte.

One of the difficulties experienced, however, has been that any lack of uniformity in the distribution of the electrolyte has interfered with the efficient operation of the cell and the object of the present invention is to provide means for ensuring even distribution of the electrolyte.

Referring to the drawings—

Figure 1:
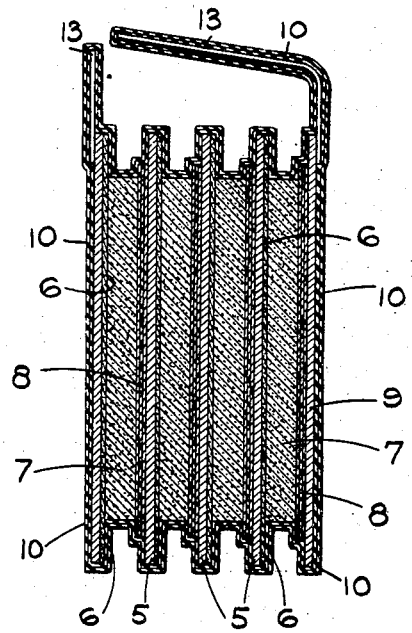
Figure 1 is a sectional elevation of a battery incorporating the present invention.

In Figure 1 of the accompanying drawings the invention is applied to a battery of the sandwich type including a plurality of zinc plates 5, each provided on one face with a carbon element or coating 6, these plates being arranged in spaced parallel relationship, with depolariser elements or tablets 7 arranged sandwichwise therebetween, and with an electrolyte wafer or diaphragm 8 between each depolariser tablet or element and the zinc face of the adjacent plate 5.

The end plate 9 has no carbon element or layer but an electrolyte wafer or diaphragm is arranged between the inner face of this plate and the adjacent depolariser tablet.

The assembly of cell elements is then coated with a laminated elastic skin 10, which completely encloses the battery and insulates and isolates the cells one from the other.

The skin 10 is shown as extending over the terminal strips 13, but it will be understood that before using the battery the coating would be removed to expose the metal strips.

The elastic skin may be of the form set forth in the specification of our prior patent application Serial No. 39,249, now Patent No. 2,146,377, February 7, 1939.

The coated battery may be inserted in a suitable casing or container.

Figure 2:
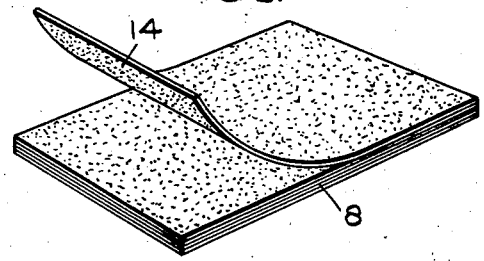
Figure 2 is a perspective view of a wafer or diaphragm according to this invention with one of the laminations partly removed.

The electrolyte wafer or diaphragm is formed from a plurality of pieces 14 of thin sheet material, each piece being coated with electrolyte and the coated sheets being superimposed and pressed or compacted together to form the laminated wafer or diaphragm shown in Figure 2.

The top sheet of the wafer is, for the purpose of illustration, shown in Figure 2 partly peeled from the remainder of the wafer and it will be appreciated that in the final form all the pieces of the wafer lie closely one upon the other with the electrolyte coating between each pair of adjacent pieces.

Figure 3:
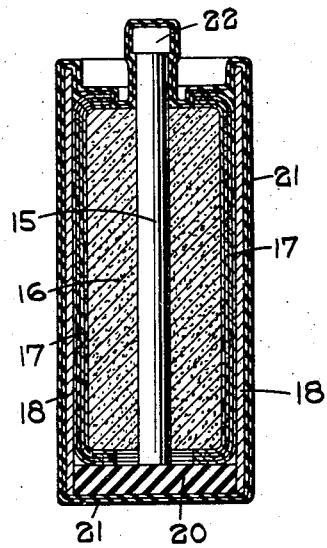
Figure 3 shows in section a battery of the sack or dollie type, constructed according to the present invention.

At Figure 3 is illustrated in section a sack or dollie type cell, constructed in accordance with this invention.

Figure 4:
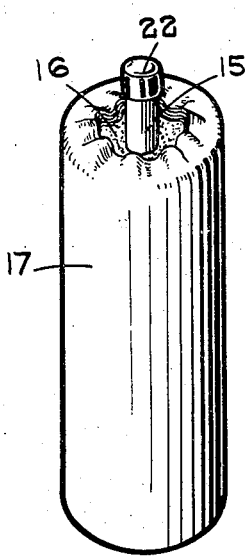
Figure 4 shows part of same removed from the zinc casing.

The carbon rod 15 is surrounded by a depolariser 16 around the exterior of which is wrapped an electrolyte wafer or diaphragm 17, constructed substantially as described above, this diaphragm being of somewhat greater length than the depolariser and being folded over the top of and beneath the depolariser, as shown in Figures 3 and 4.

The assembly of the form shown in Figure 4 is inserted in a zinc casing 18 formed from a flat sheet or blank of zinc rolled up to form a cylindrical casing open at each end, the edges of the sheet or blank overlapping slightly, as shown at 19.

A plug 20, which is conveniently formed from rubber, is inserted into one open end of the casing and the assembly shown in Figure 4 is then inserted through the other or open end and into the casing to the position shown in Figure 3.

The casing is then preferably contracted around the assembly to provide a good contact between the interior surface of the zinc casing and the exterior surface of the electrolyte diaphragm 17.

If necessary, means such as a binding around the exterior of the zinc casing may be used to prevent the casing opening or moving away from the exterior of the electrolyte diaphragm, and the whole battery is then coated with a laminated elastic skin 21 similar to the skin 10 of the construction shown in Figure 1.

This skin 21 completely encloses the cell and covers the joints between the plug 20 and the zinc casing and extends across the open top of the casing so that the cell is insulated and when used with other or similar cells there is complete isolation of cell from cell.

The coating 21 would, of course, be removed from the conducting cap 22 of the carbon electrode and to form a battery from a plurality of cells arranged co-axially one upon the other. A suitable conducting disc or piece may be provided beneath the base of the cell, this disc or piece being connected to the zinc casing in a suitable manner to provide the necessary electrical connection.

Figure 5:
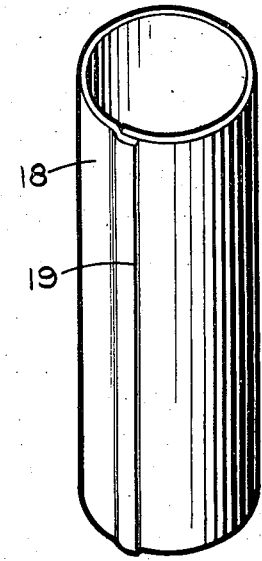
Figure 5 shows the zinc casing.

In the slight modification shown in Figure 6, the cell is constructed substantially as described with reference to Figures 3 to 5, but the carbon electrode 23 is in the form of a flat lock or spade.

Figure 6:
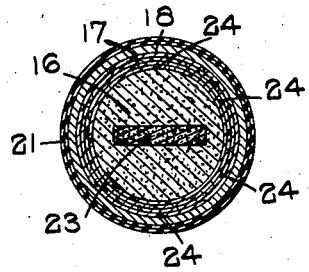
Figure 6 shows in section a slightly modified construction.

Figure 6 illustrates the preferred method of overlapping the several sheets of the electrolyte diaphragm so that all the sheets do not meet on a common line extending down the cell. The pieces are arranged in stepped formation so that the joints 24 are disposed at mutually spaced positions around the periphery of the cell and the joint between the edges on each undersheet is covered by the next overlying sheet. It is thus possible to avoid the disadvantages of all the sheets or pieces meeting on a common line without, however, overlapping the tablet such as would form a double thickness of wafer along the joint.

The material must be sufficiently thin so that when the wafer is completed it is conductive and does not undesirably increase the internal resistance of the cell. Another advantage of using pieces of thin material is that the thickness of the tablet and the size of the completed battery are not undesirably increased.

In addition, the material is preferably sufficiently tough even when moistened with the electrolyte to enable it to withstand handling after the coating of electrolyte has been applied, the toughness also being desirable to ensure that the material will hold together when in use in the dry battery.

It has been found that paper of the kind known as manila paper is particularly suitable for the purpose since it is tough and sufficiently absorbent and will retain its toughness even when moistened with the coating of electrolyte.

The electrolyte coating penetrates the individual sheets and becomes evenly distributed over and through substantially the whole of the wafer or diaphragm.

The number of pieces or sheets superimposed to form the wafer or diaphragm depends upon the particular circumstances under which it is required to work and the normal rated discharge of the battery in which the wafer is to be incorporated, but preferably not less than four pieces are used and any number up to ten or more pieces may be provided, the number also depending upon the grade or thickness of paper used.

With thin manila paper the thickness of which is of the order of 0.001 inch, it has been found that an average of six or seven superimposed pieces is suitable for batteries having a light current output. For heavy duty batteries thicker paper may be used.

The thickness of the sheets, the number of sheets and the material of which they are made are interdependent to the extent that the sheets must provide a diaphragm which forms a housing for the electrolyte which will have a low resistance and which will permit the necessary mobility to the electrolyte and retain the electrolyte and not allow it to squeeze out at the edges to any serious extent.

The different sheets in the same wafer need not all be of the same thickness or of the same material.

The electrolyte, which may be of any suitable solution and prepared in any known or convenient manner, is preferably applied in gelatinous form and may be applied to sheets cut to the required size and shape prior to the coating operation, or alternatively, may be applied to a continuous web or sheet which may subsequently be divided to form pieces of the desired size.

The electrolyte may be applied by a brush or other mechanical means, or alternatively, the paper may be dipped in or passed through a bath of electrolyte, the excess material being removed either mechanically or by gravity.

With a construction according to the present invention, the electrolyte is uniformly distributed, since it is only necessary to provide a relatively thin coating on each sheet and in this manner it is easier to obtain a uniform coating than in cases where a thick layer of gelatinous electrolyte is applied to a single piece of paper. In this latter arrangement there is considerable danger of the electrolyte being displaced locally or squeezed out from one side during assembly of the battery so that in effect the layer of electrolyte is thinner at one side of the cell than at the other, causing a tendency for local action to be set up in a dangerous manner.

When a plurality of coated sheets according to this invention are superimposed it is difficult, if not impossible to squeeze the electrolyte from one side of the wafer, since the coating on each sheet is thin and, whilst it is possible to obtain any desired quantity of electrolyte by superimposing a suitable number of coated sheets, there is no free bulk of electrolyte which can readily be displaced or squeezed out of position since the layers of paper or other material form a bond and hold the electrolyte in position.

Thus, it is possible to obtain an electrolyte wafer or diaphragm of any desired thickness and incorporating any desired quantity of electrolyte without introducing the possibility of lack of uniformity in the eelctrolyte distribution.

With the construction according to the present invention, the internal resistance of the cell is low due to the uniform electrolyte distribution with a correspondingly good conductivity and efficient life.

In addition, the insoluble chlorides or salts formed during the process of discharge of the cell are distributed in a uniform manner due to the uniform distribution of the electrolyte and the life and efficiency of operation of the battery are correspondingly increased.

In addition, the life is lengthened and the efficiency of operation increased due to the even separation of the cells by the electrolyte wafer or diaphragm and the consequent reduction in deleterious local action.

It is preferred to use paper for the sheet material which carries the electrolyte, since the desired strength and capacity for holding the electrolyte in position can be obtained with thin or fine grade paper, but if desired, fabric such as fine linen or the like may be used.

An important aspect of this invention is that two or more different electrolytes or chemical compounds may be incorporated in the tablet, for example, by coating one or more of the sheets with one electrolyte or chemical compound and one or more further sheets with another or different electrolyte or chemical so that when the sheets are superimposed to form the complete wafer, an efficient combination of the two chemicals results.

For example, with an electrolyte including the chlorides of mercury, zinc and ammonia, the mercury chloride may be provided on a sheet or piece of the wafer or diaphragm adapted to lie adjacent the zinc and the remaining chlorides applied to other sheets or pieces, the content of zinc chloride decreasing towards the side of the diaphragm adapted to lie nearest the carbon electrode.

The grade or thickness of the sheets may be selected or varied to suit the particular requirements of the battery and two or more grades or thicknesses may be used in the construction of a wafer particularly when two or more electrolytes are incorporated.

The present invention provides an ideal electrolyte membrane which I have found to be entirely satisfactory in use and which is free from the defects I have encountered in connection with the methods used prior this invention.

I may apply the electrolyte to strips, rolls or large sheets of material and subsequently cut up such strips, rolls or sheets to form the wafers or diaphragms of the desired size.

The invention is particularly applicable to dry batteries of the kind above described with reference to the drawings, but may also be applied to inert cells or batteries may up in a dry condition and put in condition for use when required, by adding water to the battery.

What I claim then is:

1. An electrolyte wafer or diaphragm for a dry battery including a plurality of flat pieces of pervious sheet material of a thickness of the order of 0.001 of an inch, some of the pieces being provided with a uniform layer of electrolyte in semi-solid form and the pieces being superimposed and compacted together in flat form before assembly in the battery so as to construct a laminated flat wafer or diaphragm with the electrolyte housed between the laminations of said wafer or diaphragm.

2. An electrolyte wafer or diaphragm for a dry battery including a plurality of flat pieces of thin manila paper of a thickness of the order of 0.001 of an inch, a layer of electrolyte in semi-solid form on each of said pieces, said layer being uniform both in thickness and consistency over the whole of the piece, said pieces being sufficiently tough to withstand handling even when moistened with electrolyte and sufficiently absorbent to hold the electrolyte, and the pieces being superimposed and compacted together in flat form before assembly in the battery to construct a laminated flat wafer or diaphragm.

3. A dry battery including a carbon electrode, a zinc electrode, a depolariser element between said electrodes and an electrolyte wafer or diaphragm between said depolariser element and said zinc electrode, said wafer or diaphragm including a plurality of flat pieces of pervious sheet material of a thickness of the order of 0.001 of an inch, some of said pieces being coated with a uniform layer of electrolyte in semi-solid form and the pieces being superimposed and compacted together in flat form before assembly in the battery to construct a preformed laminated flat wafer or diaphragm with the electrolyte housed between the laminations of said wafer or diaphragm.

4. A dry battery including a substantially flat carbon electrode, a zinc electrode in the form of a flat plate, a depolariser tablet between said electrodes, and an electrolyte wafer or diaphragm between said depolariser element and said zinc electrode, said wafer or diaphragm including a plurality of flat pieces of thin manila paper of a thickness of the order of 0.001 of an inch, some of said pieces having a thin uniform coating of electrolyte in semi-solid form, said pieces being sufficiently tough to withstand handling even when moistened with electrolyte and sufficiently absorbent to hold the electrolyte and the pieces being superimposed and compacted together in flat form before assembly in the battery to construct a preformed laminated flat wafer or diaphragm.

5. An electrolyte wafer or diaphragm for a dry battery including a plurality of flat pieces of thin pervious sheet material, a coating of electrolyte on each of said pieces, at least one of said pieces being coated with a layer of one electrolyte material in semi-solid form, at least one further piece being coated with a layer of further electrolyte material in semi-solid form, said pieces being sufficiently tough to withstand handling even when moistened with electrolyte and sufficiently absorbent to hold the electrolyte, and the pieces being superimposed and compacted together in flat form before assembly in the battery so as to construct a preformed laminated flat wafer or diaphragm in which is housed the entire electrolyte supply for the battery.

FRANK MacCALLUM.